(12) United States Patent
Tanaka

(10) Patent No.: US 10,684,608 B2
(45) Date of Patent: Jun. 16, 2020

(54) ABNORMALITY DETECTION APPARATUS AND MACHINE LEARNING DEVICE

(71) Applicant: FANUC Corporation, Yamanashi (JP)

(72) Inventor: Shinichi Tanaka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 75 days.

(21) Appl. No.: 16/105,333

(22) Filed: Aug. 20, 2018

(65) Prior Publication Data

US 2019/0064768 A1 Feb. 28, 2019

(30) Foreign Application Priority Data

Aug. 25, 2017 (JP) .................................. 2017-162637

(51) Int. Cl.
*G05B 19/00* (2006.01)
*G05B 19/4065* (2006.01)

(52) U.S. Cl.
CPC ................... *G05B 19/4065* (2013.01); *G05B 2219/33034* (2013.01); *G05B 2219/50185* (2013.01)

(58) Field of Classification Search
CPC ...... G05B 19/4065; G05B 2219/50185; G05B 2219/33034; G05B 2219/50249; B23Q 17/00; B23Q 11/0089
See application file for complete search history.

(56) References Cited

U.S. PATENT DOCUMENTS

| | | | | |
|---|---|---|---|---|
| 4,185,376 A | * | 1/1980 | Johnstone | B23B 49/001 408/56 |
| 5,240,358 A | * | 8/1993 | Hackett | B23Q 11/0035 409/141 |
| 2011/0093365 A1 | * | 4/2011 | Tiano | G05B 19/4065 705/28 |

(Continued)

FOREIGN PATENT DOCUMENTS

| | | |
|---|---|---|
| CN | 101859128 A | 10/2010 |
| CN | 104416400 A | 3/2015 |

(Continued)

OTHER PUBLICATIONS

Bossmanns, Bernd, and Jay F. Tu. "Conceptual design of machine tool interfaces for high-speed machining." Journal of Manufacturing Processes 4.1 (2002): 16-27. (Year: 2002).*

(Continued)

*Primary Examiner* — Michael D Masinick
(74) *Attorney, Agent, or Firm* — Hauptman Ham, LLP

(57) ABSTRACT

An abnormality detection apparatus includes: a state observation section that observes tool weight data on weights of tools attached to a tool exchange device, tool balance data on balances of the tools, and tool exchange state data on a state during exchange of the tools; a tool exchange state data storage section that stores the tool weight data, the tool balance data, and the tool exchange state data in association with each other; and a determination result output section that detects an abnormality in the exchange of the tools based on the tool weight data, the tool balance data, and the tool exchange state data observed by the state observation section during the exchange of the tools in the processing machine and the data stored in the tool exchange state data storage section.

5 Claims, 4 Drawing Sheets

(56) References Cited

U.S. PATENT DOCUMENTS

2016/0103444 A1 4/2016 Dgawa
2017/0044875 A1* 2/2017 Hebebrand ........... E21B 17/006

FOREIGN PATENT DOCUMENTS

| | | |
|---|---|---|
| CN | 105500087 A | 4/2016 |
| DE | 102015203735 A1 | 9/2016 |
| JP | H08115113 A | 5/1996 |
| JP | H11-188556 A | 7/1999 |
| JP | H11-333657 A | 12/1999 |
| JP | 2004-330339 A | 11/2004 |
| JP | 2008-87094 A | 4/2008 |
| KR | 10-2016-0136569 A | 11/2016 |
| WO | WO-8701798 A1 * 3/1987 | ......... B23Q 3/15546 |

OTHER PUBLICATIONS

Su, Hang, et al. "Towards Model-Free Tool Dynamic Identification and Calibration Using Multi-Layer Neural Network." Sensors 19.17 (2019): 3636. (Year: 2019).*
Notice of Allowance in JP Application No. 2017-162637, dated Jul. 2, 2019, 3pp.

* cited by examiner

ABNORMALITY DETECTION APPARATUS AND MACHINE LEARNING DEVICE

RELATED APPLICATIONS

The present application claims priority of Japanese Application Number 2017-162637, filed Aug. 25, 2017, the disclosure of which is hereby incorporated by reference herein in its entirety.

BACKGROUND OF THE INVENTION

1. Field of the Invention

The present invention relates to an abnormality detection apparatus and a machine learning device and, in particular, to an abnormality detection apparatus and a machine learning device that detect an abnormality during the exchange of tools.

2. Description of the Related Art

Tool exchange devices for automatically replacing tools that are to be attached to the spindle of machine tool have been conventionally used. In such a tool exchange device, a plurality of tools necessary for performing operations are loaded in advance. The tool exchange device turns a tool magazine to select a tool and attaches the selected tool to a spindle. In this way, the tool exchange device is configured to automatically replace a tool to be attached to the spindle of a machine tool with a specified tool according to a processing state.

The tool exchange device of a machine tool could have an error in the selection of a tool due to the wear of the mechanism part (wear of the deceleration mechanism) thereof, the looseness of a bolt, or the like or may drop loaded tools due to the wear of a grip that holds the tools. If the machine continues to operate in spite of the occurrence of such trouble, there is a likelihood of a machine body, tools, a jig, or a workpiece being damaged.

As a conventional technology for addressing such problems, Japanese Patent Application Laid-open No. H11-333657 discloses a technology for detecting an abnormality in a machine using the torque waveform of a motor that drives the tool magazine of a tool exchange device, sound (for example, motor sound or tool drop sound) generated during the exchange of tools, vibration, or the like.

However, in a tool exchange device, even the same tool exchange operation changes depending on the weights, balances, or the like of respective tools attached to a tool magazine. Therefore, when the technology described in Japanese Patent Application Laid-open No. H11-333657 is used, the torque waveform, sound, and vibration of a motor that should be detected as being abnormal are changed depending on the state in which the tools are attached to a tool magazine, which results in a difficulty in uniformly detecting an abnormality in the exchange of the tools.

SUMMARY OF THE INVENTION

In view of the above circumstances, it is an object of the present invention to provide an abnormality detection apparatus and a machine learning device capable of appropriately detecting an abnormality in the exchange of tools based on the state in which the tools are attached to a tool exchange device.

In the present invention, data items during the exchange of tools by the tool exchange devices of a plurality of machine tools are put together to collect data items on the weights and balances of various tools, a cluster analysis of the collected data items is performed according to the weights and balances of the tools, and operation data during the exchange of the tools such as a torque waveform and sound are integrated for each of clusters. Then, when determining an abnormality during the exchange of tools, an automatic tool exchange device determines to which cluster the attachment state of current tools belongs from the weights and balances of the tools at the determination and compares the attachment state of the tools with operation data integrated in the corresponding cluster to detect the abnormality.

An aspect of the present invention provides an abnormality detection apparatus that detects an abnormality during exchange of tools in a processing machine having a tool exchange device, the abnormality detection apparatus including: a state observation section that observes tool weight data on weights of the tools attached to the tool exchange device, tool balance data on balances of the tools, and tool exchange state data on a state during the exchange of the tools; a tool exchange state data storage section that stores the tool weight data, the tool balance data, and the tool exchange state data in association with each other; and a determination result output section that detects an abnormality in the exchange of the tools based on the tool weight data, the tool balance data, and the tool exchange state data observed by the state observation section during the exchange of the tools in the processing machine and the data stored in the tool exchange state data storage section.

According to the present invention, it becomes possible to appropriately detect an abnormality in the exchange of tools by a tool exchange device according to the weights and balances of the tools. By the detection of the abnormality in the exchange of the tools, it becomes possible to repair the tool exchange device at an early stage or avoid damage on a machine or a workpiece due to driving after the tools drop.

BRIEF DESCRIPTION OF THE DRAWINGS

The above and other objects and features of the present invention will become apparent from the descriptions of the following embodiments with reference to the accompanying drawings in which.

DETAILED DESCRIPTION OF THE PREFERRED EMBODIMENTS

Hereinafter, embodiments of the present invention will be described with reference to the drawings.

Figure 1:
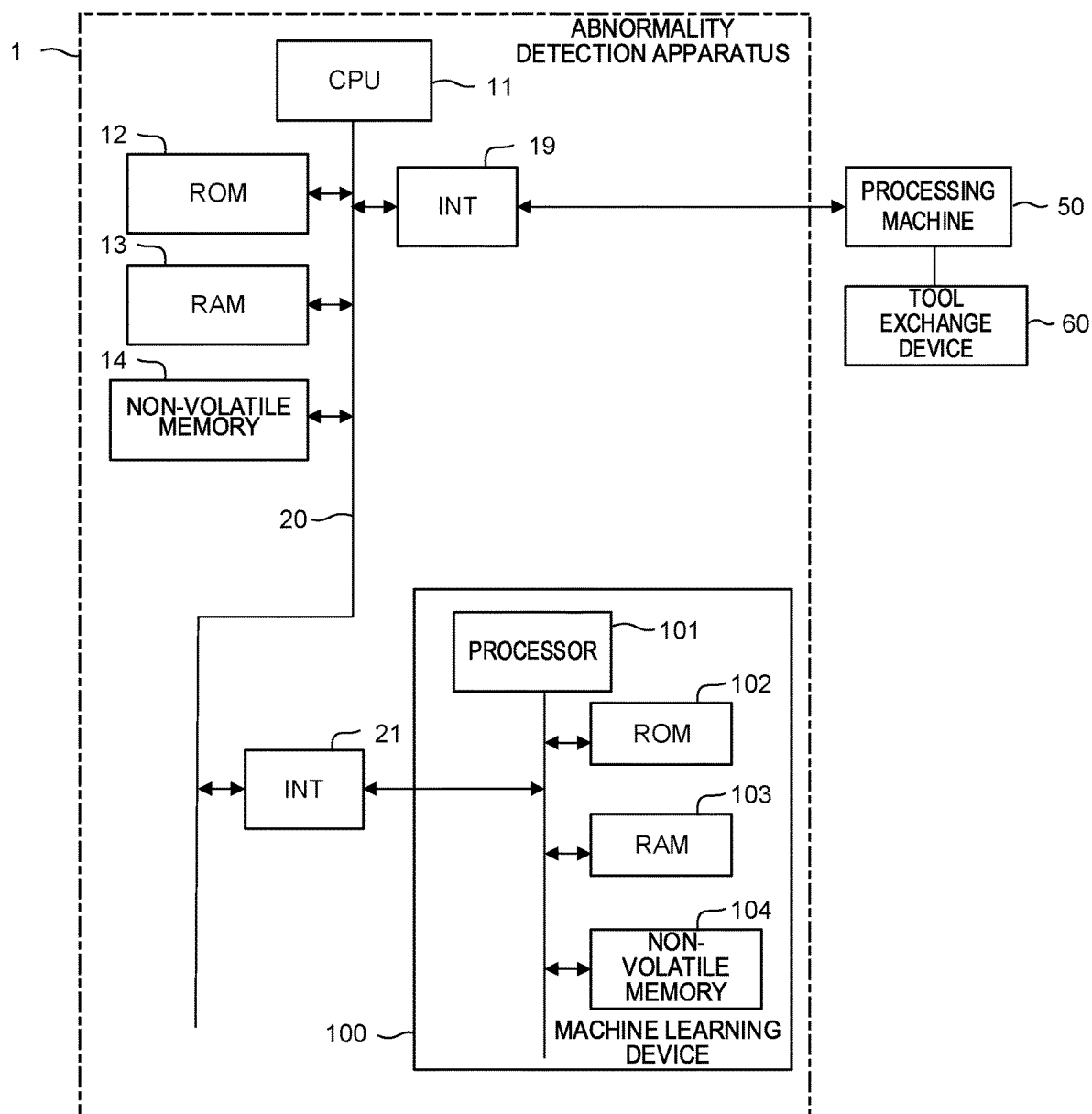
FIG. 1 is a schematic hardware configuration diagram of an abnormality detection apparatus according to an embodiment.

FIG. 1 is a schematic hardware configuration diagram showing the essential parts of an abnormality detection apparatus according to a first embodiment. An abnormality detection apparatus 1 may be implemented as, for example, a control apparatus that controls a processing machine 50 including a tool exchange device 60. Further, the abnormality detection apparatus 1 may be implemented as, for example, a computer such as a personal computer added to the processing machine 50 including the tool exchange device 60, a cell computer connected via a network to the processing machine 50 including the tool exchange device 60, and a host computer. A central processing unit (CPU) 11 of the abnormality detection apparatus 1 according to the embodiment is a processor that entirely controls the abnormality detection apparatus 1. The CPU 11 reads a system program stored in a read-only memory (ROM) 12 via a bus 20 and controls the entire abnormality detection apparatus 1 according to the system program. A random-access memory (RAM) 13 temporarily stores temporary calculation data, display data, various data input by an operator via an input section (not shown), or the like.

A non-volatile memory 14 is constituted as a memory that maintains its storage state by, for example, a backup battery (not shown) or the like even if the power of the abnormality detection apparatus 1 is turned off. The non-volatile memory 14 stores various data (the weights or the like of respective tools attached to the tool exchange device 60) input from an operator via an input section (not shown) and information (such as the torque of a motor, sound, and vibration) on the state of the tool exchange operation of the tool exchange device 60 input from the processing machine 50 via an interface 19. Various data stored in the non-volatile memory 14 may be developed into the RAM 13 when used. Further, the ROM 12 stores in advance various system programs (including a system program for controlling communication with the machine learning device 100 that will be described later) necessary for operating the abnormality detection apparatus 1.

An interface 21 is an interface for connecting the abnormality detection apparatus 1 and the machine learning device 100 to each other. The machine learning device 100 includes a processor 101 that controls the entire machine learning device 100, a ROM 102 that stores a system program or the like, a RAM 103 that temporarily stores data in various processing operations on machine learning, and a non-volatile memory 104 used to store a learning model or the like. The machine learning device 100 may observe respective information items (such as the weights of respective tools attached to the tool exchange device 60 and information on the state of the tool exchange operation of the tool exchange device 60) capable of being acquired by the abnormality detection apparatus 1 via the interface 21. Further, upon receiving an abnormality determination result output from the machine learning device 100, the abnormality detection apparatus 1 outputs a command or the like to issue an alert or suspend the tool exchange device 60.

Figure 2:
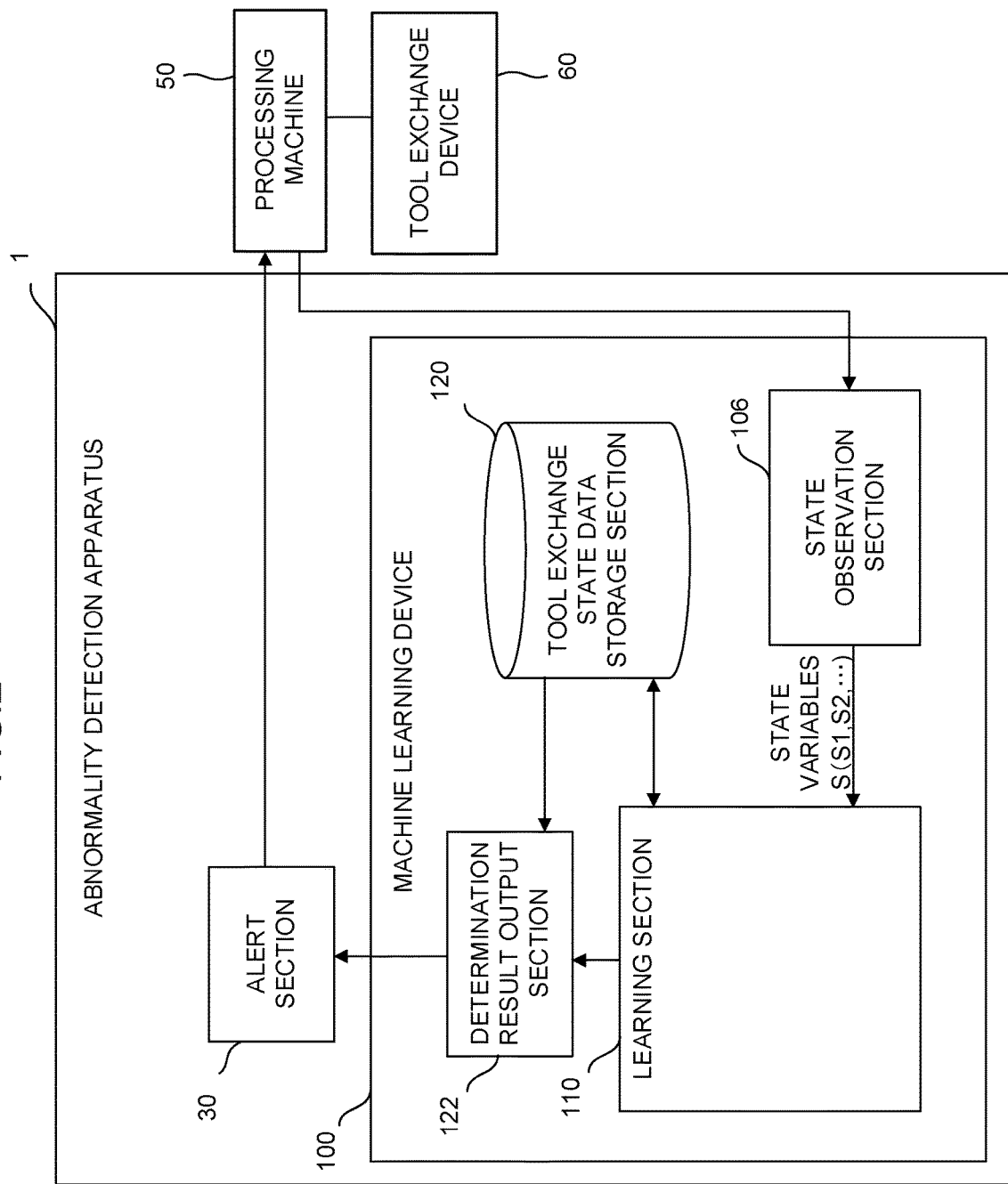
FIG. 2 is a schematic function block diagram of the abnormality detection apparatus according to the embodiment.

FIG. 2 is a schematic function block diagram of the abnormality detection apparatus 1 and the machine learning device 100 according to the first embodiment. Respective function blocks shown in FIG. 2 are realized when the CPU 11 of the abnormality detection apparatus 1 and the processor 101 of the machine learning device 100 shown in FIG. 1 perform their system programs and control the operations of the respective sections of the abnormality detection apparatus 1 and the machine learning device 100. The abnormality detection apparatus 1 of the embodiment includes an alert section 30.

The alert section 30 is function means for outputting an alert when the machine learning device 100 detects an abnormality in a tool exchange operation by the tool exchange device 60 based on the weights and balances of tools attached to the tool exchange device 60 and the state of the tool exchange operation input from the processing machine 50.

The alert section 30 may output an alert to an operator via a display section or a sound output section (not shown) of the abnormality detection apparatus 1. Further, the alert section 30 may output, as an alert, the fact that an abnormality has occurred in the exchange of tools to the processing machine 50. In this case, the processing machine 50 having received the alert from the alert section 30 may output the fact that an abnormality has been detected in a tool exchange operation by means of a lamp, display, sound, or the like through an operation panel or the like (not shown) or may suspend a processing operation and the tool exchange operation.

On the other hand, the machine learning device 100 of the abnormality detection apparatus 1 learns a model structure expressing the relationship between the distribution of the weights and balances of tools attached to the tool exchange device 60 and the state of a tool exchange operation. As shown by function blocks in FIG. 2, the machine learning device 100 of the abnormality detection apparatus 1 includes a state observation section 106, a learning section 110, and a determination result output section 122.

The state observation section 106 observes, as state variables S, tool weight data S1 on the weights of tools attached to the tool exchange device 60, tool balance data S2 on the balance of the tool exchange device 60 to which the tools have been attached, and tool exchange state data S3 on the state of a tool exchange operation. The learning section 110 learns the correlation between the distribution of the weights and balances of tools and the state of a tool exchange operation. The determination result output section 122 outputs a determination result using a learned model by the learning section 110.

As the tool weight data S1 among the state variables S observed by the state observation section 106, information input by an operator on tools attached to the tool magazine of the tool exchange device 60 may be, for example, used. The tool weight data S1 may be the total weight of tools attached to the tool magazine or may be an array of the total weight of the tools and the weights of the tools attached at the respective tool attachment positions of the tool magazine.

As the tool balance data S2 among the state variables S, information input by an operator on tools attached to the tool magazine of the tool exchange device 60 may be, for example, used. The tool balance data S2 may include, for example, the deviation or the like of the center of the gravity of the tool magazine calculated from the weights and shapes of respective tools attached to the tool magazine, the shape of the tool magazine, or the like.

As the tool exchange state data S3 among the state variables S, information acquired from sensors or the like attached to the respective parts of the tool exchange device 60 during the exchange of tools of the processing machine 50 by the tool exchange device 60 may be, for example, used. The tool exchange state data S3 may include, for example, the torque waveform of a motor that drives the tool magazine of the tool exchange device 60, a sound waveform during the exchange of tools acquired from a microphone or the like attached to the tool exchange device 60, a vibration waveform during the exchange of tools acquired from a vibration sensor attached to the tool exchange device 60, or the like.

As the tool exchange state data S3, only information in a case in which tools are normally replaced or only information (information in case of an abnormality) in a case in which the tools are not normally replaced may be selected and acquired based on information input by an operator on a normality/abnormality in the exchange of the tools. Alternatively, the tool exchange state data S3 itself may include information input by an operator on a normality/abnormality in the exchange of tools. The normality/abnormality in the exchange of tools may be determined from a suspension signal right after the exchange of the tools input by an operator when the exchange of the tools fails or may be determined from information (that is to be used in the maintenance or the like of the tool exchange device 60) input by the operator that directly indicates an abnormality in the exchange of the tools. When such an input is not performed by the operator, it may be determined that a tool exchange operation is normally operated at that time.

Note that, during so-called the training period of the machine learning device 100, respective data items included in the state variables S may be acquired from data recorded using data logger (not shown) in the past processing.

The learning section 110 performs a cluster analysis based on the tool weight data S1 and the tool balance data S2 according to any learning algorithm collectively called machine learning, and then stores the tool weight data S1 and the tool balance data S2 and the tool exchange state data S3 in a tool exchange state data storage section 120 in association with each other for each of clusters generated by the cluster analysis. Alternatively, the learning section 110 may perform a cluster analysis based on the tool weight data S1 and the tool balance data S2 stored in the tool exchange state data storage section 120 in the past. The learning section 110 may add tags to respective clusters obtained as a result of a cluster analysis and store the tags added to the clusters in the tool exchange state data storage section 120 in association with data belonging to the clusters. The learning section 110 may perform learning repeatedly based on a set of data items including the above state variables S.

By repeatedly performing such a learning cycle, the learning section 110 interprets the distribution of the weights (tool weight data S1) and balances (tool balance data S2) of tools attached to the tool magazine of the tool exchange device 60 as a set of clusters and then automatically interprets the state (tool exchange state data S3) of a tool exchange operation in each of the clusters. At the start of a learning algorithm, the correlation between the clusters of the tool weight data S1 and the tool balance data S2, and the tool exchange state data S3 is substantially unknown. However, as the learning section 110 advances learning, the tool exchange state data S3 corresponding to the respective clusters of the tool weight data S1 and the tool balance data S2 is gradually accumulated in the tool exchange state data storage section 120. Based on the accumulated data, it becomes possible to interpret the correlation between the clusters of the tool weight data S1 and the tool balance data S2 and the tool exchange state data S3. Then, after the correlation is interpreted to a certain reliable extent, a learning result (learned model) by the learning section 110 is made available to determine whether tools are normally replaced when a tool exchange operation is performed in a current tool attachment state.

As described above, in the machine learning device 100 of the abnormality detection apparatus 1, the learning section 110 learns the correlation between the clusters of the weights and balances of tools attached to the tool magazine of the tool exchange device 60 and the state of a tool exchange operation according to a machine learning algorithm using the state variables S observed by the state observation section 106. The tool weight data S1, the tool balance data S2, and the tool exchange state data S3 of the state variables S are uniquely calculated from respective information items acquired by the abnormality detection apparatus 1. Therefore, according to the machine learning device 100 of the abnormality detection apparatus 1, it becomes possible to automatically and accurately determine, without relying on calculation or estimation, whether the state of a tool exchange operation is normal in the clusters of the weights and balances of tools attached to the tool magazine of the tool exchange device 60 using a learning result by the learning section 110.

The determination result output section 122 determines a normality/abnormality in the state of a current tool exchange operation with respect to the clusters of the weights and balances of current tools based on a learning result by the learning section 110, and then outputs a determination result to the alert section 30. The determination result output section 122 acquires clusters to which the weights and balances of currently-input tools belong from the learning section 110, and then determines the normality/abnormality in the state of a current tool exchange operation using the tool weight data S1, the tool balance data S2, and the tool exchange state data S3 belonging to the clusters among data items stored in the tool exchange state data storage section 120. Based on, for example, the tool exchange state data S3 belonging to the clusters of the weights and balances of current tools and stored in the tool exchange state data storage section 120, the determination result output section 122 may calculate a threshold (such as, for example, the threshold of a torque value at which an abnormality is determined, a sound level, the threshold of a frequency, and the threshold of a vibration level) of a normality/abnormality in a tool exchange operation in the clusters and compare the calculated threshold with the state of a current tool exchange operation to detect the normality/abnormality in the tool exchange operation. The determination result output section 122 may calculate such a threshold using the tool exchange state data S3 in a case in which a tool exchange operation is normally performed or the tool exchange state data S3 in a case in which the tool exchange operation is abnormally performed. Alternatively, the determination result output section 122 may calculate a threshold using both the tool exchange state data S3 in a case in which a tool exchange operation is normally performed and the tool exchange state data S3 in a case in which the tool exchange operation is abnormally performed.

Based on, for example, the tool exchange state data S3 belonging to the clusters of the weights and balances of current tools and stored in the tool exchange state data storage section 120, the determination result output section 122 may determine whether current tool exchange state data S3 is close to a set of tool exchange state data items S3 in a case in which a tool exchange operation is normally performed or a set of tool exchange state data items S3 in a state in which the tool exchange operation is abnormally performed, in order to detect a normality/abnormality in the tool exchange operation.

Based on, for example, the tool exchange state data S3 belonging to the clusters of the weights and balances of current tools and stored in the tool exchange state data storage section 120, the determination result output section 122 may generate a determination formula (for example, a determination formula for calculating a prescribed determination value from a torque value, a sound level, a frequency, a vibration level, or the like at which an abnormality is determined) for determining a normality/abnormality in a tool exchange operation in the clusters and then detect the normality/abnormality in the tool exchange operation using a determination value calculated based on the generated determination formula and the state of a current tool exchange operation.

The determination result output section 122 may perform, for each of clusters, machine learning using the tool exchange state data S3 belonging to each of the clusters to construct a learned model for determining a normality/abnormality in each of the clusters and detect the normality/abnormality in a current tool exchange operation using the learned model.

As a modified example of the abnormality detection apparatus 1, the state observation section 106 may observe, as the state variables S, tool exchange command data S4 on a command during the exchange of tools besides the tool weight data S1, the tool balance data S2, and the tool exchange state data S3. The tool exchange command data S4 may be acquired from, for example, the block of a processing program.

According to the above modified example, the machine learning device 100 may perform a cluster analysis based on the tool weight data S1, the tool balance data S2, and the tool exchange command data S4 and make a comparison of the tool exchange state data S3 for each of clusters generated by the cluster analysis. Therefore, it becomes possible to detect a normality/abnormality in the exchange of tools with higher accuracy.

Figure 3:
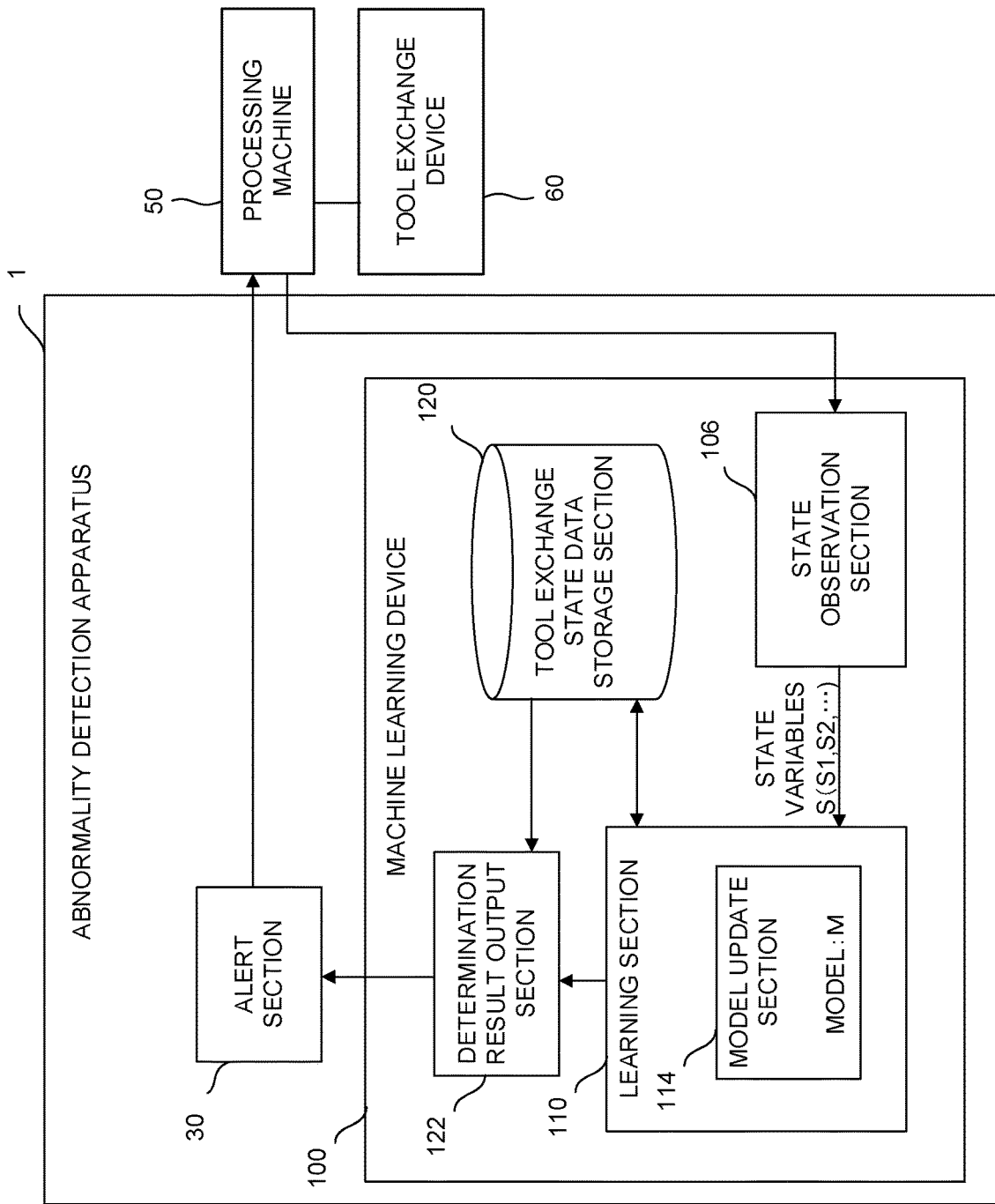
FIG. 3 is a schematic function block diagram showing a mode of the abnormality detection apparatus.

In the machine learning device 100 having the above configuration, the algorithm of a cluster analysis performed by the learning section 110 based on the tool weight data S1 and the tool balance data S2 is not particularly limited, but any learning algorithm may be employed as machine learning. FIG. 3 shows a mode of the abnormality detection apparatus 1 in FIG. 2 and a configuration including the learning section 110 that performs unsupervised learning as an example of a learning algorithm. The unsupervised learning is a method in which only input data items are given in large amounts to a learning device to identify a feature suggesting the relationship between the input data items to learn a model for estimating a desired output with respect to a new input. In the unsupervised learning, it is possible to perform compression, classification, shaping, or the like on input data without giving supervised data corresponding to input data.

In the machine learning device 100 of the abnormality detection apparatus 1 shown in FIG. 3, the learning section 110 includes a model update section 114 that updates a model M showing the distribution of the weights (tool weight data S1) and balances (tool balance data S2) of tools from the state variables S. The learning section 110 learns the distribution of the weights (tool weight data S1) and balances (tool balance data S2) of tools by repeatedly updating the model M through the model update section 114.

The initial value of the model M is, for example, expressed by the simplification (a linear function) of the distribution of the weights (tool weight data S1) and balances (tool balance data S2) of tools and given to the learning section 110 before the start of the unsupervised learning. The model update section 114 identifies the feature of the distribution of the weights (tool weight data S1) and balances (tool balance data S2) of tools from a large amount of the state variables S given to the learning section 110, and then updates the model M according to, for example, a prescribed update rule based on the feature.

Figure 4:
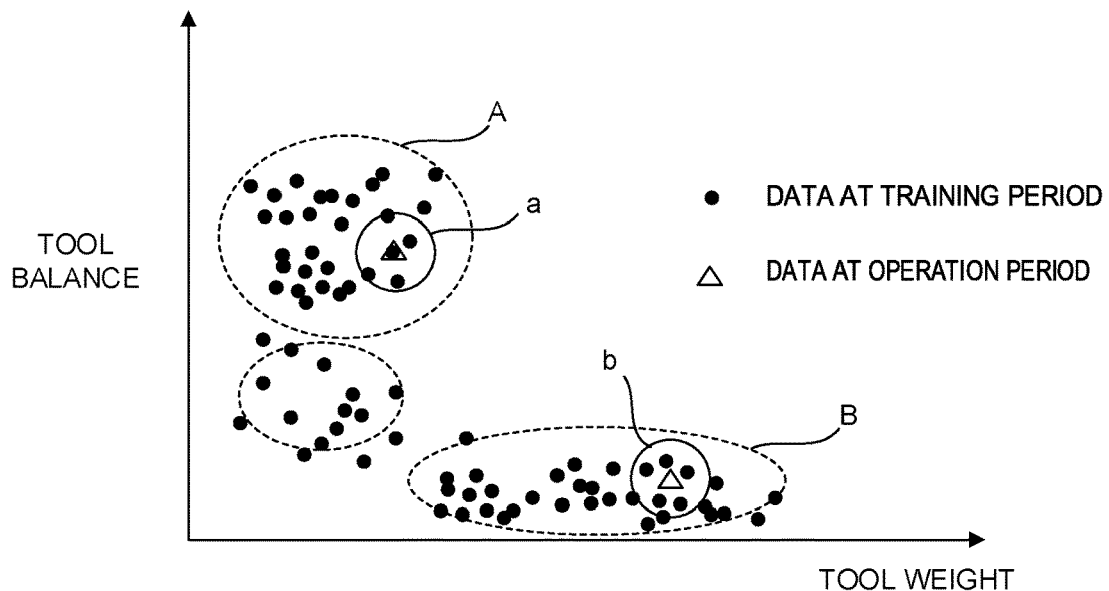
FIG. 4 is a diagram for describing a method for determining a nearest neighbor method.

When a cluster analysis of the distribution of the weights (tool weight data S1) and balances (tool balance data S2) of tools is performed by the unsupervised learning, a nearest neighbor method may be used as an example to determine to which cluster the weights (tool weight data S1) and balances (tool balance data S2) of newly-acquired tools belong. When a graph in which the weights (tool weight data S1) and balances (tool balance data S2) of tools are set in respective axes is, for example, used as a model M updated based on the state variables S observed by the state observation section 106 of the machine learning device 100 at the training period of the machine learning device 100, the weights (tool weight data S1) and balances (tool balance data S2) of the tools form a set of clusters having a certain tendency as shown in FIG. 4 (note that the tool weight data S1 and the tool balance data S2 are expressed by a two-dimensional graph as those each taking one value for the purpose of simplifying a description in FIG. 4 but they are actually handled by a multi-dimensional graph since each of the data items is expressed by an array). In the nearest neighbor method, when a group (sample) of the weights (tool weight data S1) and balances (tool balance data S2) of tools observed by the state observation section 106 at an operation period is plotted on the graph of a model M, a cluster to which the sample belongs may be determined based on to which cluster k points near the point of the sample belong. On the other hand, when the k points are not present within a prescribed distance r from the point of the sample, it may be determined that the sample does not belong to any of the clusters. In FIG. 4, when k=5, for example, a sample a belongs to a cluster A since five groups of the weights (tool weight data S1) and balances (tool balance data S2) of tools belonging to the cluster A are present near the sample a, and a sample b belongs to a cluster B since five groups of the weights (tool weight data S1) and balances (tool balance data S2) of tools belonging to the cluster B are present near the sample b.

The configuration of the above abnormality detection apparatus 1 may be described as a machine learning method (or software) performed by the processor 101. The machine learning method is a method for learning the relationship between the distribution of the weights and balances of tools and the state of a tool exchange operation, the method causing a CPU in a computer to execute: a step of observing the tool weight data S1, the tool balance data S2, and the tool exchange state data S3 as the state variables S showing the current state of an environment; and a step of learning the distribution of the weights and balances of the tools and the state of the tool exchange operation in association with each other using the state variables S.

Figure 5:
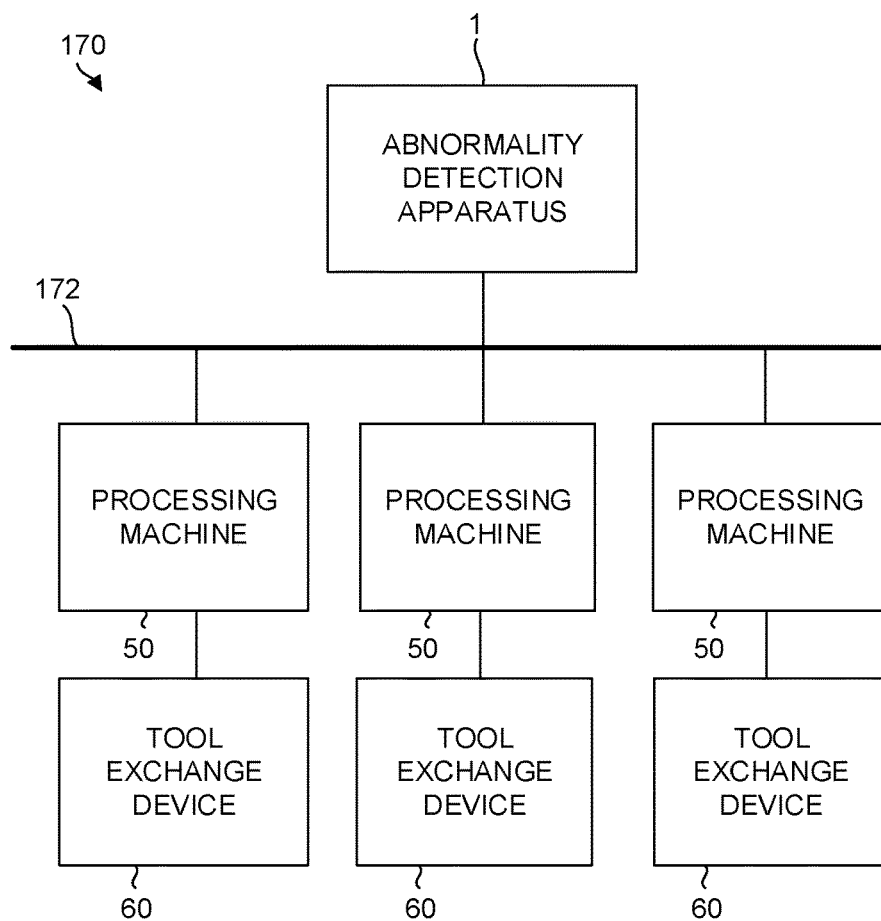
FIG. 5 is a schematic function block diagram showing a mode of a system in which an abnormality detection apparatus is incorporated.

FIG. 5 shows a system 170 according to an embodiment in which the system 170 has a plurality of processing machines 50 including tool exchange devices 60. The system 170 is constituted by an abnormality detection apparatus 1, the plurality of processing machines 50 including at least the same tool exchange devices 60, and a wired/wireless network 172 that connects the abnormality detection apparatus 1 and the processing machines 50 to each other.

In the system 170 having the above configuration, a learning section 110 of a machine learning device 100 of the abnormality detection apparatus 1 may learn the relationship between the distribution of the weights and balances of tools of the tool exchange device 60 in each of the plurality of processing machines 50 and the state of a tool exchange operation and then automatically and accurately determine, without relying on calculation or estimation, a normality/abnormality in the tool exchange operation of the tool exchange device 60 in each of the processing machines 50 using a learning result. According to the configuration of the system 170, it is possible to acquire a broader range of data sets (including state variables S) about the plurality of tool exchange devices 60 and improve the speed and reliability of learning the relationship between the distribution of the weights and balances of tools of the tool exchange devices 60 and the state of a tool exchange operation with the acquired data sets as inputs.

The system 170 may take a configuration in which the abnormality detection apparatus 1 is implemented as a cloud server or the like connected to the network 172. According to the configuration, a desired number of (the processing machines 50 including) the tool exchange devices 60 may be connected to the machine learning device 100 where necessary regardless of the existing locations and times of the plurality of tool exchange devices 60.

The embodiments of the present invention are described above. However, the present invention is not limited to the examples of the above embodiments but may be carried out in various modes with the addition of appropriate modifications.

For example, a learning algorithm performed by the machine learning device 100, a calculation algorithm performed by the machine learning device 100, and the like are not limited to the above algorithms, but various algorithms may be employed.

In addition, the above embodiments describe a configuration in which the abnormality detection apparatus 1 and the machine learning device 100 have different CPUs (processors). However, the machine learning device 100 may be realized by the CPU 11 of the abnormality detection apparatus 1 and a system program stored in the ROM 12.

The embodiments of the present invention are described above. However, the present invention is not limited to the examples of the above embodiments but may be carried out in other modes with the addition of appropriate modifications.

The invention claimed is:

1. An abnormality detection apparatus that detects an abnormality during exchange of tools in a machine tool having a tool exchange device, the abnormality detection apparatus comprising:
a state observation section that observes tool weight data on weights of the tools attached to the tool exchange device, tool balance data on balances of the tools, and tool exchange state data on a state during the exchange of the tools;
a tool exchange state data storage section that stores the tool weight data, the tool balance data, and the tool exchange state data in association with each other; and
a determination result output section that detects an abnormality in the exchange of the tools based on the tool weight data, the tool balance data, and the tool exchange state data observed by the state observation section during the exchange of the tools in the processing machine and the data stored in the tool exchange state data storage section.

2. The abnormality detection apparatus according to claim 1, further comprising:
a learning section that performs a cluster analysis of the tool weight data and the tool balance data stored in the tool exchange state data storage section, wherein
the learning section stores information for identifying clusters obtained as a result of the cluster analysis in association with the tool weight data, the tool balance data, and the tool exchange state data stored in the tool exchange state data storage section.

3. The abnormality detection apparatus according to claim 2, wherein,
when the tool weight data, the tool balance data, and the tool exchange state data are observed by the state observation section during the exchange of the tools in the processing machine,
the learning section determines to which cluster the tool weight data and the tool balance data belong, and
the determination result output section detects an abnormality in the exchange of the tools based on the tool exchange state data, and tool exchange state data belonging to the cluster among tool exchange state data items stored in the tool exchange state data storage section.

4. The abnormality detection apparatus according to claim 3, wherein
the determination result output section detects an abnormality in the exchange of the tools based on a threshold calculated based on the tool exchange state data belonging to the cluster among the tool exchange state data items stored in the tool exchange state data storage section.

5. The abnormality detection apparatus according to claim 1, wherein
the tool exchange state data includes information on a result as to whether the exchange of the tools is normally performed or an abnormality has occurred in the exchange of the tools.

* * * * *